(12) United States Patent
Keller et al.

(10) Patent No.: US 6,495,483 B1
(45) Date of Patent: Dec. 17, 2002

(54) LINEAR METALLOCENE POLYMERS CONTAINING ACETYLENIC AND INORGANIC UNITS AND THERMOSETS AND CERAMICS THEREFROM

(75) Inventors: Teddy M. Keller, Alexandria, VA (US); Eric J. Houser, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/818,193

(22) Filed: Mar. 14, 1997

(51) Int. Cl.$^7$ ...................... C04B 35/571; C04B 35/589
(52) U.S. Cl. ........................ 501/88; 501/96.2; 264/625; 264/627; 252/62.58; 252/62.59
(58) Field of Search ........................ 252/62.58, 62.59; 501/88, 96.2; 264/625, 627

(56) References Cited

U.S. PATENT DOCUMENTS

| | | | | |
|---|---|---|---|---|
| 4,681,860 A | * | 7/1987 | Bujalski | 501/88 |
| 4,757,035 A | * | 7/1988 | Baney et al. | 501/88 |
| 4,800,221 A | | 1/1989 | Marko | |
| 4,806,612 A | | 2/1989 | Chandra et al. | |
| 4,851,491 A | | 7/1989 | Riccitiello et al. | |
| 4,945,072 A | * | 7/1990 | Burns et al. | 501/96.2 |
| 4,946,919 A | | 8/1990 | Johnson | |
| 5,145,812 A | * | 9/1992 | Arai et al. | 501/96.2 |
| 5,241,029 A | | 8/1993 | Barton et al. | |
| 5,272,237 A | | 12/1993 | Keller et al. | |
| 5,292,779 A | | 3/1994 | Keller et al. | |
| 5,296,418 A | * | 3/1994 | Takeda et al. | 501/96.2 |
| 5,332,701 A | * | 7/1994 | Bryson et al. | 501/96.2 |
| 5,348,917 A | | 9/1994 | Keller et al. | |
| 5,457,074 A | | 10/1995 | Barton et al. | |
| 5,483,017 A | | 1/1996 | Keller et al. | |
| 5,552,505 A | | 9/1996 | Keller et al. | |
| 5,844,052 A | * | 12/1998 | Keller et al. | 525/474 |
| 5,986,032 A | * | 11/1999 | Keller et al. | 525/474 |
| 6,265,336 B1 | * | 7/2001 | Keller et al. | 501/88 |

OTHER PUBLICATIONS

Manners, Ian, "Chain Metals, Incorporating Transition Element into Polymer Structures May Yield Materials with Unusual and Useful Physical and Catalytic Properties", *Chemistry in Britain*, pp. 46–49, Jan. 1996.

Tang et al., "Novel Ceramic and Organometallic Depolymerization Products from Poly(ferrocenylsilanes) via Pyrolysis", *J. Chem. Soc.*, pp.. 523–525, (1993).

Petersen et al., "Pyrolysis of Poly(ferrocenylsilanes): Synthesis and Characterization of Ferromagnetic Transition Metal–Containing Ceramics and Molecular Depolymerization Products", *Chem. Mater.*, 7, pp. 2045–2053, (1995).

Ungurenasu, Cezar, "Organometallic Polysilylenes. First Organometallic Route to Fe–SiC Composites", *Macromolecules*, 29, pp. 7297–7298, (1996).

Hodson et al., "Transition Metal Functionalized Polysiloxanes as Precursors to Magnetic Ceramics".

MacLachlan et al., "Spirocyclic [1]Ferfocenophanes: Novel Cross–Linking Agents for Ring–Opened Poly(ferrocenes)", 29, pp. 8562–8569, (1996).

Manners, Ian, "Ring–Opening Polymerization (ROP) of Strained, Ring–Tilted Silicon–Bridged [1])Ferrocenophanes: Synthetic Methods and Mechanisms", *Polyhedron*, vol. 15, No. 24, pp. 4311–4329, (1996).

Pudelski et al., "Synthesis and Properties of Poly(ferrocenyldihydrosilane) Homopolymer and Random Copolymers", *Macromolecules*, vol. 28, No. 22, Oct. 23, 1995.

Nelson et al., "Synthesis and Ring–Opening Polymerization of Highly Strained, Ring–Tilted [2]Ruthenocenophanes", *Augen. Chem. Int. Ed. Engl.*, 33, No. 9, pp. 989–991, (1994).

Nelson et al., "Synthesis, Structures, and Polymerization Behavior of Disilane–Bridged and Bis(disilane)–Bridged [2]Ruthenocenophanes", *Organometallics*, 13, pp. 3703–3710, (1994).

Lavastre et al., "Novel Ruthenium– or Iron–Containing Tetraynes as Precursors of Mixed–Metal Oligomers", *Organometallics*, 15, pp. 1530, 1531, (1996).

LeVanda et al., "Mixed–Valance Differocenylacetylene Cation", *Journal of the American Chemical Society*, 96:21, pp. 6788–6789, Oct. 16, 1974.

Sundar et al., "Synthesis and Characterization of Linear Boron–Silicon–Diacetylene Copolymers", 29, pp. 3647–3650, (1996).

Ijadi–Maghsoodi et al., "Efficient, "One–Pot" Synthesis of Silylene–Acetylene and Disilylene–Acetylene Perceramic Polymers from Trichloroethylene", *Journal of Polymer Science: Part A: Polymer Chemistry*, vol. 28, pp. 955–965, (1990).

Hedberg et al., "Preparation and Reactions of Decachloroferrocene and Decacalorothenocene", *Journal of the American Chemical Society*, 95:3, pp. 870–875, Feb. 6, 1973.

Bishop et al., "Symmetrically Disubstituted Ferrocenes I. The Synthesis of Potential Bidentate Ligands", *J. Organometal. Chem.*, 27, pp. 231–240, (1971).

(List continued on next page.)

*Primary Examiner*—Karl Group
(74) *Attorney, Agent, or Firm*—John J. Karasek; Joseph T. Grunkemeyer (57) ABSTRACT

Transition metal-containing ceramic or carbonaeous material are formed from novel linear polymers containing a random distribution of repeating acetylenic units, organotransition metal complexes, siloxane, boron, silicon, and/or carborane-siloxane units. The precursor thermosets are formed by crosslinking of the linear polymers through the acetylenic units in the polymer backbone. The ceramics may also be formed directly by pyrolysis of the linear polymers. The preceramic polymers are potentially useful for fabricating ceramic fibers and composite materials having enhanced strength, hardness and toughness as well as superior mechanical, optical, electrical and/or magnetic properties.

17 Claims, 3 Drawing Sheets

OTHER PUBLICATIONS

Rosenblum et al., "Synthesis of Ferrocenylacetylenes", *Journal of Organometallic Chemistry*, 6, pp. 173–180 (1966).

Schlogl et al., "Ferrocen–Acetylene, VI. Synthese und Lichtabsorption Von Ferrocenyl–Polinen", *Journal of Organometallic Chemistry*, pp. 399–411, (1966).

Rausch et al., "A Facile Route to Ferrocenyl– and 2–Thienylarylacetylenes" 2703–2704.

Pauson et al., "Ferrocene Derivatives. Part XIII. Some Ferrocenylethylene and –acetylene Derivatives", pp. 2990–2996.

Rausch et al., "Studies on the Reactions of Ferrocenylphenylacetylene and Diferrocenylacetylene with ($n^5$–Cyclopentadienyl)Diacarbonylcobalt, and an X–Ray Crystallographic Determination of One of the Products: ($n^5$–Cyclopentadienyl)–($n^4$–1,3–Diferrocenyl–2,4–Diphenycyclobutadiene)Cobalt", *Journal of Organometallic Chemistry*, 149, pp. 245–264 (1978).

Levanda et al., "Mixed Valance Cations. Chemistry of π–Bridged Analogues of Biferrocene and Biferrocenylene". *J. Org. Chem.*, vol. 41, No. 16, (1976).

Colbert et al., "Synthesis, Characterization and Electrochemical Studies of 1',6'–Bis(ethynyl)Biferrocene and Some Metal Complexes: Novel Heterometallic Compounds Towards Non–Linear Optics", *Polyhedron*, vol. 14, No. 19. pp. 2759–2766, (1995).

Marsh et al., "Catalytic Graphitzation by Iron of Istropic Carbon from Polyfurfuryl Alcohol, 725–1090K. A High Resolution Electron Microscope Study", *Carbon*, vol. 21, No. 1, pp. 81–87, (1983).

Laine et al., "Preceramic Polymer Routes to Silicon Carbide", *Chem. Mater.*, 5, pp. 260–279, (1993).

Birot et al., "Comprehensive Chemistry of Polycarbosilanes, Polysilzanes, and Polycarbosilazanes as Precursors of Ceramics", *Chem. Rev.*, 95, pp. 1443–1477, (1995).

Corriu et al., *J. Org. Chem.*, 509 (1996) 249–257.

Corriu et al., *Organometallics*, 1994, 13, 3194–3202.

Fitzer et al., Carbon Reinforcements and Carbon/Carbon Composites, Springer (1988) 110–117.

* cited by examiner

LINEAR METALLOCENE POLYMERS CONTAINING ACETYLENIC AND INORGANIC UNITS AND THERMOSETS AND CERAMICS THEREFROM

BACKGROUND OF THE INVENTION

1. Field of the Invention

This invention relates to a new class of transition metal containing linear polymers of varying molecular weight that are useful for conversion to high temperature thermosets and ceramics. These new materials have repeat units that contain alkynyl groups for cross-linking purposes along with organotransition metal complexes, silyl, siloxyl, boranyl, or di(silyl or siloxyl)carborane units. These novel linear polymers with the metal units in the backbone are soluble in most organic solvents and can be easily fabricated from the melt into shaped components, which enhance their importance for high temperature structural, magnetic, and microelectronic applications. Cross-linking of alkynyl groups is known to occur by either photochemical or thermal processes.

2. Technology Background

The incorporation of transition metals into a polymer structure has long been seen as a good way of preparing materials with different properties from conventional carbon-based polymers. Small molecule transition metal complexes and solid state compounds possess an array of interesting high temperature, hardness, redox, magnetic, optical, electrical, and catalytic properties. In addition, the rich diversity of coordination numbers and geometries available for transition elements offer the possibility of accessing polymers with unusual conformational, mechanical, and morphological characteristics.

The development of polymers with transition metals in the main chain structure would be expected to provide access to processable, specialty materials with similarly attractive physical properties that would be of interest as pyrolytic precursors to metal-containing ceramics. Transition metal-based polymers might also function as processable precursors for making metal-containing ceramic films and fibers with high stability and desirable physical properties. Most transition metal-based polymers reported to date, however, do not contain units for conversion to a thermoset and thus afford low char yields at elevated temperatures.

Despite early synthetic problems of constructing macromolecular chains, researchers have now prepared a variety of metal-containing polymers with novel properties. Ferrocene-based polymers appear to be particularly promising as reported by Ian Manners in *Chain Metals, Chemistry In Britain*, January 1996, pp. 46–49. Because of ferrocene's ability to release and accept an electron reversibly, there is considerable interest in developing these materials as electrode mediators and in energy storage devices.

These mediators, for example, facilitate electron transfer between an enzyme such as glucose oxidase, where the redox active sites are buried in a protein sheath and an electrode. Ferrocene-based polymers have been successfully used as electron relays in electrochemical biosensors for measuring glucose levels. Scientists have also fabricated microelectrochemical devices such as diodes using ferrocene-based polymers.

Other studies have reported on the formation of Fe—Si—C materials from the pyrolysis of iron containing polymers. See, for example: (1) Tang, B. Z.; Petersen, R.; Foucher, D. A.; Lough, A.; Coombs, N.; Sodhi, R.; Manners, I. *J Chem. Soc., Chem Commun.* 1993, 523–525; (2) Peterson, R; Foucher, D. A.; Tang, B. Z.; Lough, A.; Raju, N. P.; Greedan, J. E.; Manners, I. *Chem. Mater.* 1995, 7, 2045–2053; and (3) Ungurenasu, C. *Macromolecules* 1996, 29, 7297–7298; (4) Hodson, A. G. W; Smith, R. A. *Transition Metal Functionalised Polysiloxanes as Precursors to Magnetic Ceramics*, Faculty of Applied Sciences, University of the West of England, Bristol, BS16 1QY.

Spirocyclic [1]-ferrocenophanes have been reported to function as convenient cross-linking agents for poly (ferrocenes) via thermal ring-opening copolymerization reactions by MacLachlan, M. J.; Lough, A. J.; and Manners, I, in *Macromolecules*, 1996, 29, 8562–8564.

The use of ring-opening polymerization (ROP), a chain growth process, is reported by I. Manners in *Polyhedron*, Vol. 15, No. 24. pp 4311–4329, 1996 to allow access to a range of high molecular-weight polymers with skeletal transition metal atoms having novel properties.

Several poly(ferrocenylsilanes) have been synthesized and converted into ceramics upon heating to 1000° C. under inert conditions. See, for example, Pudelski, J. K.; Rulkens, R.; Foucher, D. A.; Lough A. J.; MacDonald, P. M. and Manners, I., *Macromolecules*, 1995, 28, 7301–7308. The ceramic yields by thermogravimetric analysis (TGA), however, were in the range of 17 to 63%.

Alternative transition metals such as ruthenium have also been reported as being incorporated into a metallocenophane structure by Nelson, J. A.; Lough, A. J., and Manners, I in "Synthesis and Ring-Opening Polymerization of Highly Strained, Ring-Titled[2]Ruthenocenophanes" *Angew. Chem., Int. Ed. Engl.* 1994, 33, 989–991 and in "Synthesis, Structures, and Polymerization Behavior of Di-silane-Bridged and Bis (disilane)-Bridged[2]Ruthenocenophanes" in *Organometallics* 1994, 13, 3703–3710. Novel ruthenium or iron containing tetraynes as precursors of mixed-metal oligomers are reported in *Organometallics* 1996, 15, 1530–1531. Mixed valence diferrocenylacetylene cation compounds have been reported in the *Journal of the American Chemical Society*, 96:21, 1974, pp. 6788–6789.

The synthesis and characterization of linear boron-silicon-diacetylene copolymers is reported by R. A. Sundar and T. M. Keller in *Macromolecules* 1996, 29, 3647–3650. Additionally, the efficient, "one-pot" synthesis of silyleneacetylene and disilylene-acetylene preceramic polymers from trichloroethylene is reported in the *Journal of Polymer Science: Part A: Polymer Chemistry*, Vol. 28, 955–965 (1990).

Furthermore, the preparation and reactions of decachloroferrocene and decachlororuthenocene is disclosed in the *Journal of the American Chemical Society*, 95, 870–875 (1973). Symmetrically disubstituted ferrocenes are discussed in the *Journal of Organometallic Chemistry*, 27 (1971) pp. 241–249 as well as ferrocenyl-acetylene being disclosed in the J. Organometal. Chem., 6 (1966) pp. 173–180 and 399–411. Ferrocenyl- and 2-thienylarylacetylenes are reported by M. D. Rausch; A. Siegal and L. P. Kelmann in *J. of Org. Chem.* 1966, Vol. 31 p. 2703–2704.

Ferrocenyl ethylene and acetylene derivatives are also reported by P. L. Pauson and W. E. Watts in *J. Chem. Soc.* 1963, 2990–2996. Studies on the reactions of ferrocenylphenylacetylene and diferrocenyl-acetylene are reported in the *Journal of Organometallic Chemistry*, 149 (1978) 245–264. The chemistry of π-bridged analogues of biferrocene and biferrocenylene is discussed in the *Journal of Organic*

Chemistry, Vol. 41, No. 16, 1976, 2700–2704. The synthesis of 1', 6'-bis(ethynyl)-biferrocene and metal complexes referring to non-linear optics is presented in Polyhedron, Vol. 14, No. 19, pp. 2759–2766 (1995).

In addition to these documents discussing the various compounds and polymers, the catalytic graphitization by iron of isotropic carbon is reported in Carbon, Vol. 21, No. 1, pp. 81–87, 1983. Preceramic polymer routes to silicon carbide are disclosed by Richard M. Laine in Chem. Mater. 1993, 5, 260–279; and the comprehensive chemistry of polycarbosilanes, polysilazanes and polycarbosilazanes as precursors of ceramics is thoroughly reported in Chem. Rev., 1995, 95, 1443–1477.

U.S. Pat. Nos. 4,800,221 and 4,806,612 also respectively disclose silicon carbide preceramic polymers and preceramic acetylenic polysilanes which may be converted into ceramic materials.

U.S. Pat. Nos. 5,241,029 and 5,457,074 disclose diorganosilacetylene and diorganosilvinylene polymers which can be thermally converted into silicon carbide ceramic materials.

U.S. Pat. No. 4,851,491 discloses polyorganoborosilane ceramic polymers which are useful to generate high temperature ceramic materials upon thermal degradation. U.S. Pat. No. 4,946,919 also relates to boron-containing ceramics formed from organoboron preceramic polymers which are carboralated acetylenic polymers.

U.S. Pat. Nos. 5,272,237; 5,292,779; 5,348,917; 5,483,017 disclose carborane-(siloxane or silane)-unsaturated hydrocarbon based polymers reported to be useful for making high temperature oxidatively stable thermosets and/or ceramics.

U.S. Pat. No. 5,552,505 discloses copolymers formed from aromatic acetylenic monomers or prepolymers formed therefrom and carborane-(siloxane or silane)-unsaturated hydrocarbon polymers reportedly useful to form articles, adhesives, matrix materials, or coatings, or which may be pyrolyzed to form carbon-ceramic composites. Each of the documents cited herein contains valuable information and each is incorporated herein by reference in its entirety and for all purposes.

Most of the carborane-siloxane and/or carborane-silane polymers made by others have elastomeric properties rather than properties of more rigid polymeric products like thermosetting polymers or ceramics. There is a need for polymers that behave less like elastomeric polymers and more like thermosets and which, upon pyrolysis, form ceramics.

There is, therefore, a need for oxidatively stable materials having thermosetting properties for making rigid components therefrom which withstand high temperatures and which have high strength and high hardness properties and/or which optionally may have magnetic properties.

Furthermore, there is a need for transition metal-based polymers which contain units for conversion to thermosets and which afford high char yields at elevated temperatures. There is also a need for such polymers which would be useful precursors to novel materials unavailable from other sources, and which may exhibit unique nonlinear optical (NLO) properties.

SUMMARY OF THE INVENTION

It is therefore an object of the present invention to provide polymers having backbones incorporated with organotransition metals complexes along with silicon, acetylenic, and/or boron units which are useful as precursors to novel materials unavailable from other sources.

It is another object of the present invention to provide polymers having backbones incorporated with organotransition metal complexes along with silicon, acetylenic, and/or boron units which can be readily converted into high temperature thermosets.

It is another object of the present invention to provide polymers having backbones incorporating organotransition metal complexes along with silicon, acetylenic, and/or boron units which can readily be converted into high temperature materials which exhibit high strength properties, high hardness values, and electrical and/or magnetic properties.

It is yet another object of the present invention to provide transition metal based polymers which contain inorganic units and units for conversion to thermoset polymers and which afford high char yields at elevated temperatures.

It is still another object of the present invention to permit the formulation of ceramics containing a variable and controllable amount of metal and various cluster sizes.

These and other objectives are accomplished by first forming polymers having the following general composition:

wherein:
x is greater than or equal to one;
z is greater than or equal to one;
w is greater than or equal to one;
y is greater than or equal to one;
a is greater than or equal to one;
$R^1$, $R^2$, $R^3$, $R^4$, $R^5$, $R^6$, $R^7$, and $R^8$ may be the same or different and wherein each equal H, unsubstituted or substituted hydrocarbon moieties, unsubstituted or substituted alkyl or arylamino moieties; unsubstituted or substituted alkyl or aryl phosphino moieties; halogen;
M=Fe, Ru, Os, or a combination thereof; and
E is wherein:
f is greater than or equal to zero;
g is greater than or equal to one;
h is greater than or equal to one;
p is greater than or equal to zero;
q is greater than or equal to zero;
s is greater than or equal to zero and is greater than or equal to one when q is greater than or equal to one;
t is greater than or equal to zero
k=3 to 16;
$R^9$, $R^{10}$, $R^{11}$, $R^{12}$ may be the same or different and wherein each=H, unsubstituted hydrocarbon moieties or substituted hydrocarbon moieties; and $R^{13}$=unsubstituted or substituted hydrocarbon moieties.

As suggested above, $R^1$ through $R^{13}$ may each be one of any monovalent organic group, or, in the case of $R^1$–$R^{12}$, may be hydrogen. $R^1$ through $R^{13}$ may be aromatic, aliphatic, or include both aliphatic and aromatic moieties. $R^1$ through $R^{13}$ may be saturated or include unsaturation. In all cases, $R^1$ through $R^{13}$ may be halo-substituted. The carborane may be ortho meta or para.

Also, throughout the specification and claims, it should be understood that the value of E, and its associated variables, may differ at each occurance of E within the polymer, within the definitions provided for E and its associated variables. Thus, throughout the specification and claims, it should be understood that E and the variables included therein do not represent singular and constant values throughout the polymer. Instead, E and the variables included therein represent values that may vary, within the proscribed limits, throughout the polymer.

Typical groups for $R^9$–$R^{12}$ are, for example, hydrogen, methyl, ethyl, n-propyl, isopropyl, phenyl and tolyl. More often, $R^9$–$R^{12}$ are hydrogen, methyl, or ethyl. Most often $R^9$–$R^{12}$ are hydrogen or methyl.

Typically, $R^{13}$ is methyl, ethyl, n-propyl, isopropyl, and the like, or phenyl, tolyl, and the like; most typically wherein $R^{13}$ is methyl, ethyl or phenyl.

A typical "E" component may have k=3 to 12; a more typical "E" component having k=5 to 10; the even more typical "E" component having k=8 to 10; and the most typical "E" component having k=10.

Typical ranges for "f" include 0 to 10; more typically 0 to 6; and most typically from 0 to 2.

Typical ranges for "g" include 1 to 10; more typically 1 to 6; and most typically from 1 to 2.

Typical ranges for "h" include 1 to 50; more typically 1 to 20; and most typically from 1 to 5.

Typical ranges for "p" include 0 to 50; more typically 0 to 20; and most typically from 0 to 5.

Typical ranges for "q" include 0 to 10 more typically 0 to 4; and most typically from 0 to 2.

Typical ranges for "s" include 0 to 10; more typically 1 to 6; and most typically from 1 to 2.

Typical ranges for "t" include 0 to 10; more typically 0 to 6; and most typically from 0 to 2.

Typical ranges for "w" in these organometallic polymers, thermosets, and ceramics are from 1 to 100; more typically from 1 to 50; more often typically from 1 to 20; even more often from 1 to 10; and most often 1 to 3.

Typical ranges for "y" in these organometallic polymers, thermosets, are from 1 to 100; more typically from 1 to 50; more often from 1 to 20; even more often 1 to 10; and most often 1 to 3.

Typical ranges for "z" in these organometallic polymers, thermosets, and ceramics are from 1 to 100; more typically from 1 to 80; more often from 1 to 50; even more often 1 to 30; and most often 1 to 20.

Typical "M" components of these novel organometallic polymers, thermosets and ceramics include transition metals; more typically being Fe, Ru, Os or combinations thereof; most typically being Fe, Ru or combinations thereof; most preferred being Fe. Different amounts of iron can be added to these polymers, thermosets, and ceramics depending on the additive compounds or combination of compounds, for example, ferrocene, biferrocene, triferrocene, and the like may be incorporated. Typically "a" in these polymers, thermosets and ceramics may range from 1 to 20; more typically being from 1 to 10; more often being from 1 to 8; even more often being from 1 to 5; most often being from 1 to 3.

It should be understood that the general formula for the polymers describes both random and block copolymers. Throughout the specification and the claims that follows, the general polymer formula provided above will be used to represent a polymer having the structural elements shown, independent of the nature of the terminal groups. It should be further understood that a group described as "substituted" may be, for example, halo or haloalkyl substituted, unless otherwise explicitly stated.

The following general reaction represented in Scheme 1 illustrates the synthesis of the metallocene polymers containing acetylenic and inorganic units; the formation of thermosets therefrom; and the ultimate formation of the novel ceramics. In Scheme 1, X is a leaving group, such as a halogen, tosylate, and trifluoromethane sulfonate. Where $EX_2$ in Scheme 1 is a mixture of various compounds in which E and X meet the above-provided definitions, E and its associated variables will have different values at different occurances within the polymer. Of course, each E, and its associated variable within the polymer, will meet the definitions provided for them in the present application.

SCHEME 1

Synthesis of Metallocene Polymers Containing Acetylenic and Inorganic Units; Thermosets; and Ceramics wherein all variables are as described above.

Throughout the specification and claims, it should be understood that the the structure represents a complex structure consisting of a plurality of cross-linked acetylenic moieties. The structure shown is not intended to be representative of the actual cross-links existing within that structure. In reality, the cross-linked acetylenic moiety may include several different cross-linking structures such as those shown below:

DETAILED DESCRIPTION OF THE PREFERRED EMBODIMENT

The following detailed description of the invention is provided to aid those skilled in the art in practicing the present invention. However, it should not be construed to unduly limit the present invention. Variations and modifications in the disclosed embodiments may be made by those of ordinary skill in the art without departing from the scope of the present inventive discovery.

This invention discloses a new class of novel metallocene polymers containing acetylenic and inorganic units; a new class of novel thermosetting polymers made therefrom; and a new class of novel ceramics made from these. Scheme 1 (in the "Summary of the Invention" section above) illustrates the synthesis of these novel materials according to the present invention.

The conversion of the linear polymers to the cross-linked polymers is accomplished by either exposing the linear polymer to heat or light. Prior to cross-linking, fibers, foams (or other porous materials) and/or particles, etc., made from, e.g., glass, carbon, silicon carbide, and boron carbide, or metals, can be placed in the material to allow the formation of a composite material upon cross-linking. The extent of thermal conversion of the carbon-to-carbon triple bonds in the linear metallocene polymers to form the thermosetting polymers is dependent on both the curing temperature and the curing time. The heating of the linear polymers is carried out over a curing temperature range sufficient for the reaction of the carbon-to-carbon triple bonds of the individual linear polymers to occur resulting in the formation of a mass of cross-linked polymers. The heating of the linear polymers is carried out over a curing time sufficient for the reaction of the carbon-to-carbon triple bonds of the individual linear polymers to occur resulting in the formation of the cross-linked polymers.

In general, the curing time is inversely related to the curing temperature. The typical temperature range, the more typical temperature range, the most typical temperature range and the preferred temperature range for the thermal conversion of linear polymers to the cross-linked thermoset polymers are, typically, 150°–500° C., 200°–400° C., 225°–375° C., and 250°–350° C., respectively. The typical curing time, the more typical curing time, and the most typical curing time for the thermal conversion of linear polymers to the cross-linked thermoset polymers are 1–48 hours, 2–24 hours, and 8–12 hours, respectively.

The photo cross-linking process, of converting the carbon-to-carbon triple bonds of the linear polymers into unsaturated cross-linked moieties necessary for forming the thermosetting polymers, is dependent on both the exposure time and the intensity of the light used during the photo cross-linking process. Ultraviolet (UV) light is the most preferred wavelength of light used during the photo-cross-linking process.

The exposure time of the linear polymers to the UV light is inversely related to the intensity of the UV light used. The exposure time to the UV or to other light used is that time which is sufficient for the carbon-to-carbon triple bonds of the linear polymers to be cross-linked to form the thermosetting polymers. The intensity of the light used is that intensity which is sufficient for the carbon-to-carbon triple bonds of the linear polymers to be cross-linked to form the thermoset polymers.

Furthermore, the wavelength of the light used is not limited to the UV range. The wavelength of light used is that wavelength which is sufficient for the carbon-to-carbon triple bonds of the linear copolymers to be cross-linked to from the thermoset copolymers. The typical exposure time, the more typical exposure time, and the most typical exposure time are 1–100 hours, 24–36 hours, and 12–24 hours, respectively. Curing times of 4–8 hours are also relatively common. Examples of the conversion for linear copolymers to the cross-linked thermosets are given infra.

General Scheme 2 also illustrates, generally, the synthesis of these novel organometallic polymers which can be converted to thermosets and ultimately formed into ceramics.

SCHEME 2

(2)

(where E is as defined above)

↓ heat (~250° C. to ~350° C.) or uv light thermoset

↓ pyrolysis ceramic

As can be noted from the synthesis of these hybrid copolymers the silyl, siloxyl, carboranedisiloxyl or boranyl groups are separated randomly by a metallocenyl group and/or an acetylenic group. The synthesis of these copolymers are straightforward and high-yielding. For example, the synthesis of the copolymers made according to the examples was performed using the method outlined in Scheme 2. Hexachlorobutadiene is reacted with four equivalents of n-butyllithium affording dilithiobutadiyne. Treatment of dilithiobutadiyne with 2 molar equivalents of dimethyldichlorosilane followed by addition of dilithioferrocene yields the linear copolymer after aqueous workup or quenching with trimethylsilylchloride followed by aqueous workup.

The setup of this reaction makes it simple to change the chemical make-up of these copolymers by varying the molar ratios of dilithiometallocene and dilithiobutadiyne such that their total number of moles is equivalent to the number of moles of the silyl, siloxyl, carboranesiloxyl and boranyl dihalides, ditosylates, and bis(trifluoromethane sulfonates) used. In addition, substituting trichloroethylene for hexachlorobutadiene leads to a copolymer with only one carbon-carbon triple bond in the repeat unit. Thus, by forming the appropriate alkynyl salt, the length of the alkynyl moiety which is incorporated into the copolymer can be controlled. The synthesis of these salts is disclosed in U.S. Pat. No. 5,483,017 which, as noted previously, is herein incorporated by reference in its entirety for all purposes.

Typically, the value of x in the general formula of those novel organometallic copolymers can be varied from 1 to 10. Acetylenic derivatives having the general formula $H(C\equiv C)_nH$ can be readily converted into the dilithio salts by reacting with n-butyllithium. The respective dilithio salts, with values of x varying from 1 to 10, can then be incorporated into the backbone of the copolymers as shown. The value of x, typically from 1 to 10; more typically from 1 to 8; most typically from 1 to 5; more often from 1 to 3; and most often from 1 to 2.

Substituting 1,3-dichlorotetramethyldisiloxane for dimethyldichlorosilane would give a disiloxyl spacer in the copolymer instead of a silyl spacer.

Another important way to modify the chemical composition of these copolymers, thermosets, and ceramics is to change the identity of the metallocenylene unit. For instance, use of dilithioruthenocene in place of dilithioferrocene would give a copolymer containing ruthenium in the repeat unit. Mixed metal systems can be obtained by substituting a partial molar quantity of one dilithiometallocene for another. For example, the reaction of one molar equivalent of dilithioferrocene and one equivalent of dilithioruthenocene with two equivalents of dilithiobutadiyne and four equivalents of dimethyldichlorosilane would yield a copolymer containing both iron and ruthenium in the repeat unit. Substituted metallocenes may also be incorporated into the copolymer where the substituent is compatible with dilithiation to form the substituted dilithiometallocene. Thus, use of dilithiobutyferrocene and dilithiobutadiyne to react with dimethyldichlorosilane would give a copolymer containing butylferrocenyl groups in the repeat unit. Therefore, it is possible to tailor a copolymer according to specific needs.

These linear copolymers can readily be converted to high temperature thermosets upon polymerization through the acetylenic units at temperatures above 150° C. For example, the linear copolymer, Polymer I, contains acetylenic units through which cross-linking to a network (thermoset) polymer can occur under thermal conditions. Thermal treatment of Polymer I to 1000° C. under inert conditions affords a char yield of 75–90%. In essence, the organometallic linear copolymers of this invention may exhibit unique nonlinear optical (NLO) properties and serve as precursors to both thermosets and ceramics, which exhibit unique properties. As noted above, polymers containing ruthenocene and other organotransition metal complexes can also be synthesized in the same manner as described.

EXAMPLES

All reactions were carried out under inert atmosphere using standard Schlenk techniques. Tetrahydrofuran (THF) was distilled from sodium/benzophenone under $N_2$ immediately prior to use. Ferrocene was purchased from Strem Chemical and sublimed prior to use. $(LiC_5H_4)_2Fe$ tmeda was prepared according to literature procedures (i.e., Bishop, J. J.; Davison, A.; Katcher, M. L.; Lichtenberg, D. W.; Merrill, R. E.; Smart, J. C. *J. Organomet Chem.* 1971, 27, 241). Hexachlorobutadiene was purchased from Aldrich Chemical Co. and distilled prior to use. N, N, N', N'-tetramethylethylenediamine-(tmeda) and n-BuLi (2.5 M in hexanes) were purchased from Aldrich Chemical Co. and used as received. Dilithiobutadiyne was prepared according to literature procedures (Ijadi-Maghsooke, S.; Barton, T. J. *Macromolecules* 1990, 23, 4485; and, Ijadi-Maghsooke, S.; Pang, Y.; Barton, T. J. *J. Polym. Sci.,* Part A: *Polym. Chem.* 1990, 28, 955). Dichlorodimethylsilane and dichloromethysilane were purchased from United Chemical Technologies or Strem Chemical and distilled from Mg chips under $N_2$ immediately prior to use. The 1,7-bis (chlorotetramethyldisiloxyl)-m-carborane was purchased from Dexsil Corp. and used as received. All other chemicals were of reagent grade.

Thermogravimetric analyses (TGA) were performed on a TA Instruments SDT 2960 Simultaneous DTA-TGA thermogravimetric analyzer. Differential scanning calorimetry (DSC) experiments were performed on a DuPont 910 instrument. All thermal measurements were carried out at a heating rate of 10° C./min and a gas flow rate of 60 mL/min. Gel permeation chromatography (GPC) data were collected using a Hewlett-Packard Series 1050 pump and two Altex u-sphereogel columns (size $10^3$ and $10^4$ Å, respectively) connected in series. All GPC values were referenced to polystyrene standards. Infrared spectra were recorded using a Nicolet Magna 750 FTIR spectrometer. $^1$H and $^{13}$C NMR spectra were recorded on a Bruker AC-300 NMR spectrometer in CDCl$_3$. Elemental analyses were performed by E&R Microanalytical Laboratory, Corona, N.Y.

The new ferrocenylene-silylene/siloxyl-diacetylene linear copolymers, Polymers I and II, were also prepared as shown in general Scheme 2 (supra).

Polymer I

Polymer II

Dilithiobutadiyne was generated in situ by reacting hexachlorobutadiene with four equivalents of n-butyllithium at −78° C. The reaction of dilithiobutadiyne with two equivalents of either dimethyldichlorosilane or 1,7-bis (chlorotetramethyl)-m-carborane at 0° C. in THF was followed by treatment with one equivalent of dilithioferrocene.tmeda. After work-up, the copolymers were obtained as tacky solids in 83–86% yield.

Figure 4:
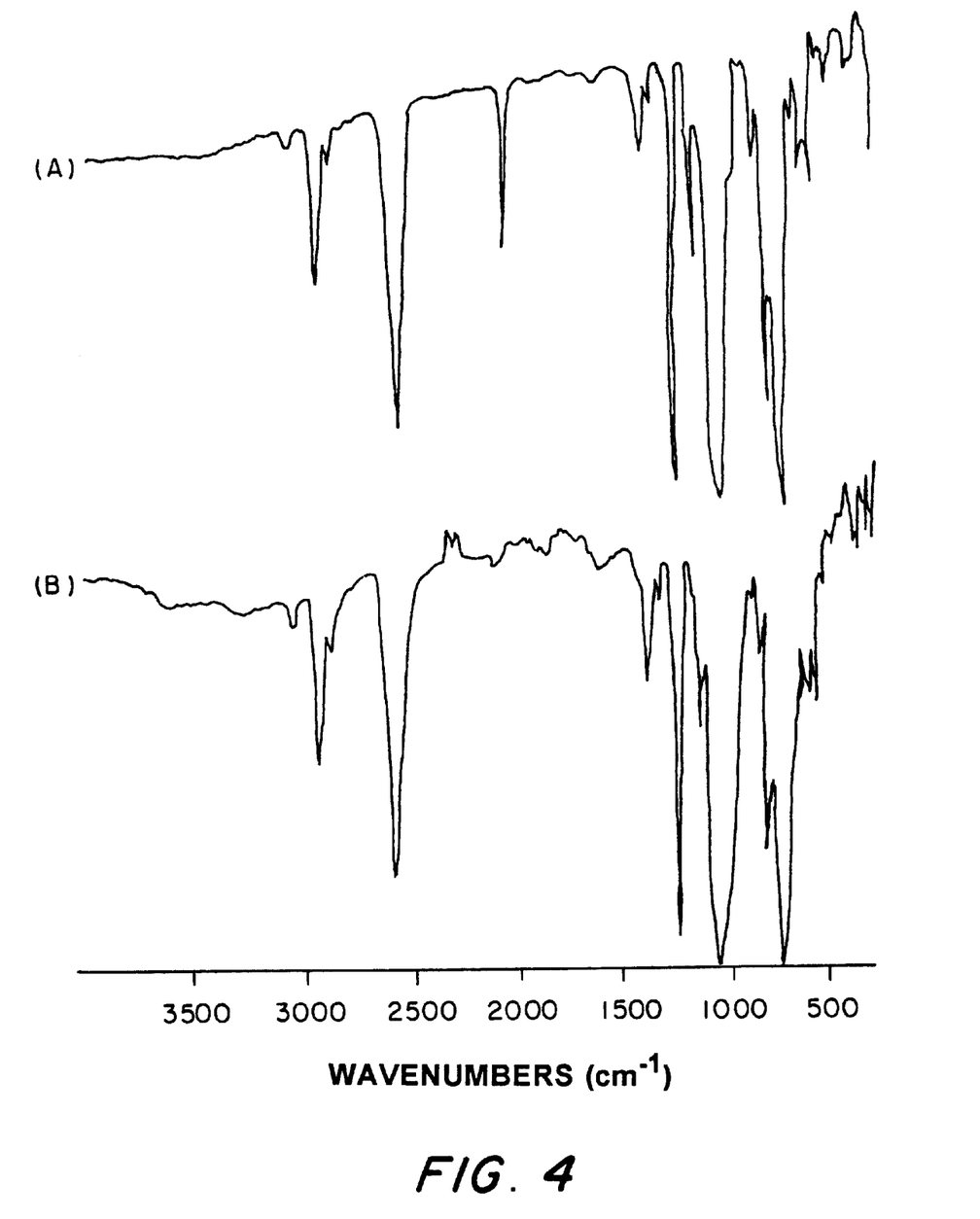
FIG. 4 are the FTIR(KBr) spectra of ferrocenylene-carborane-siloxyl diacetylene (polymer II (A)) and thermoset (B) obtained by heat treatment of the polymer to 450° C.

The infrared spectrum (NaCl) of Polymer I showed absorption bands at 3087, 2959, 2066, 1251, 1166, 1036, and 804 cm$^{-1}$. The bands at 3087, 1251, and 1166 cm$^{-1}$ are assigned to the 1,1'-ferrocenylene group. The absorption at 2066 cm$^{-1}$ is attributed to the butadiyne group. The bands at 2959 and 804 cm$^{-1}$ are assigned to the C—H and Si—C stretches of the dimethylsilylene groups, respectively. The infrared spectrum (KBr) of Polymer II was similar to that of Polymer I with an additional prominent absorption at 2596 cm$^{-1}$ (vB—H) verifying the presence of the carborane group. The butadiyne stretch appears at 2170 cm$^{-1}$. Bands at 2962, 1260, and 1075 cm$^{-1}$ are assigned to C—H, Si—C, and Si—O bonds of the tetramethyldisiloxyl linkages, respectively. A band at 3093 cm$^{-1}$ is attributed to the C—H stretch of the 1,1'-ferrocenylene groups (FIG. 4).

The $^1$H NMR (300 MHz, CDCl$_3$) spectrum of Polymer I showed resonances at 0.2 ppm and between 4.5 and 5.5 ppm assigned to the methyl groups on the dimethylsilylene groups and cyclopentadienyl protons of the 1,1'-ferrocenylene linkages, respectively. The $^{13}$C{$^1$H} NMR (75 MHz, CDCl$_3$) spectrum of Polymer I showed resonances at −0.44 and −0.20 ppm assigned to the methyl carbons of the dimethylsilylene groups. The resonances for the 1,1'-ferrocenylene carbons were observed at 73.56, 72.40, and 67.81 ppm.

The $^1$H NMR (300 MHz, CDCl$_3$) spectrum of Polymer II showed resonances at 0.34, 0.27, 0.22, and 0.10 ppm for the siloxyl methyl groups. The 1.1'-ferrocenylene proton resonances appeared at 4.25 and 4.05 (major peaks) with smaller peaks of approximately equal intensity at 4.35, 4.30, 4.16, and 4.11 ppm. The B-H protons appear as a series of broad signals between 1.0 and 3.5 ppm. The $^{13}$C{$^1$H}NMR (75 MHz, CDCl$_3$) spectrum of Polymer II showed the siloxyl methyl groups at 0.62, 0.55, 0.48 and 0.30 ppm, the 1,1'-ferrocenylene carbon resonances at 72.97 (minor), 72.83, 71.67, 71.60 (minor), and 71.12 ppm and the carboranyl carbon shifts at 68.31 an 67.90 (minor peak) ppm. The diacetylenic carbons appear as two small singlets at 87.0 and 84.6 ppm.

Figure 1:
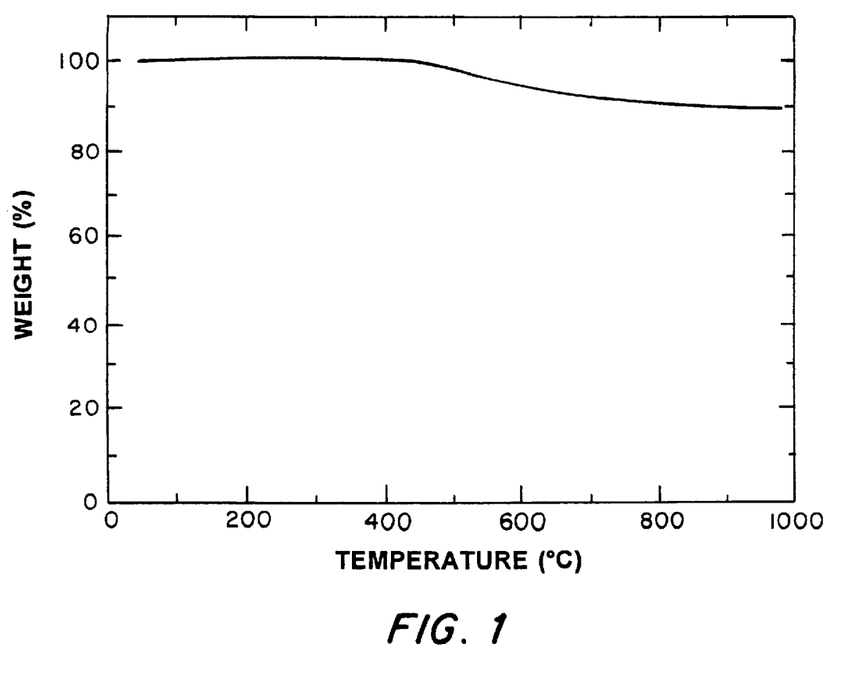
FIG. 1 is a graphic depiction of the thermal stability of poly(ferrocene-methylsilane-diacetylene).
Figure 2:
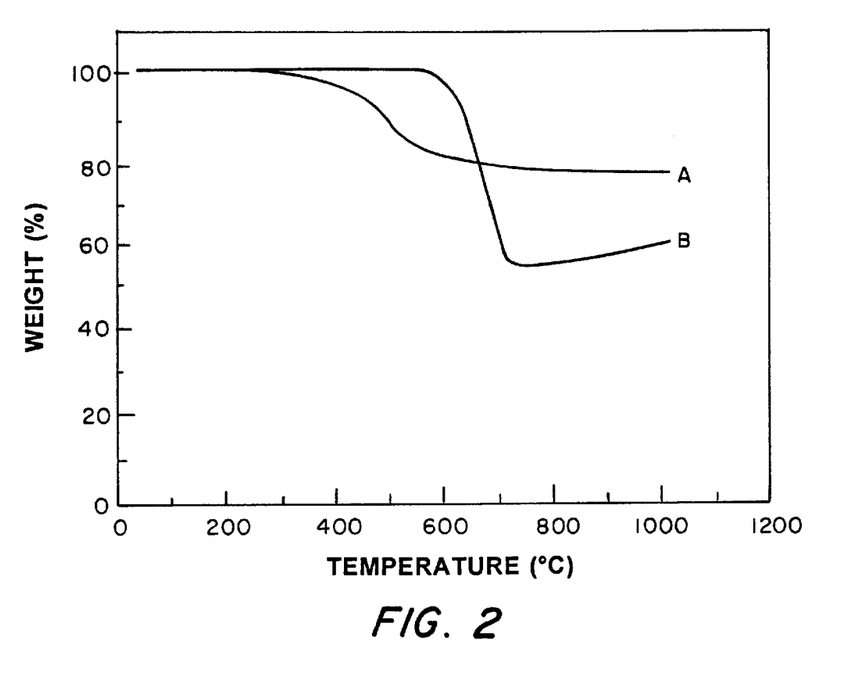
FIG. 2 is a thermogravimetric analysis (TGA) of dimethylsilylene-ferrocenylene-diacetylene polymer under $N_2$ (A) and the resulting char in air (B).

Thermogravimetric analysis (TGA) of Polymer I and II showed that these materials exhibit high thermal stabilities. Pyrolysis of Polymer I to 1000° C. (10° C./min, under N$_2$) gave 77% weight retention (FIG. 2). The ceramic yield observed for Polymer I can be compared to that reported for poly(dimethylsilylene-1,1$^1$-ferrocenylene), which showed a weight retention of 36% at 1000° C. See: (a) Tang, B.-Z.; Petersen, R.; Foucher, D. A.; Lough, A.; Coombs, N.; Sodhi, R.; Manners, I. *J Chem. Soc. Chem Commun.* 1993, 523; (b) Petersen, R.; Foucher, D. A.; Tang, B.-Z.; Lough, A.; Raju, N. P.; Greedan, J. E.; Manners, I. *Chem. Mater.* 1995, 7, 2045. This difference is attributed to the formation of a cross-link through the diacetylene units prior to pyrolysis (vide infra) which significantly reduces weight loss due to depolymerization.

Figure 3:
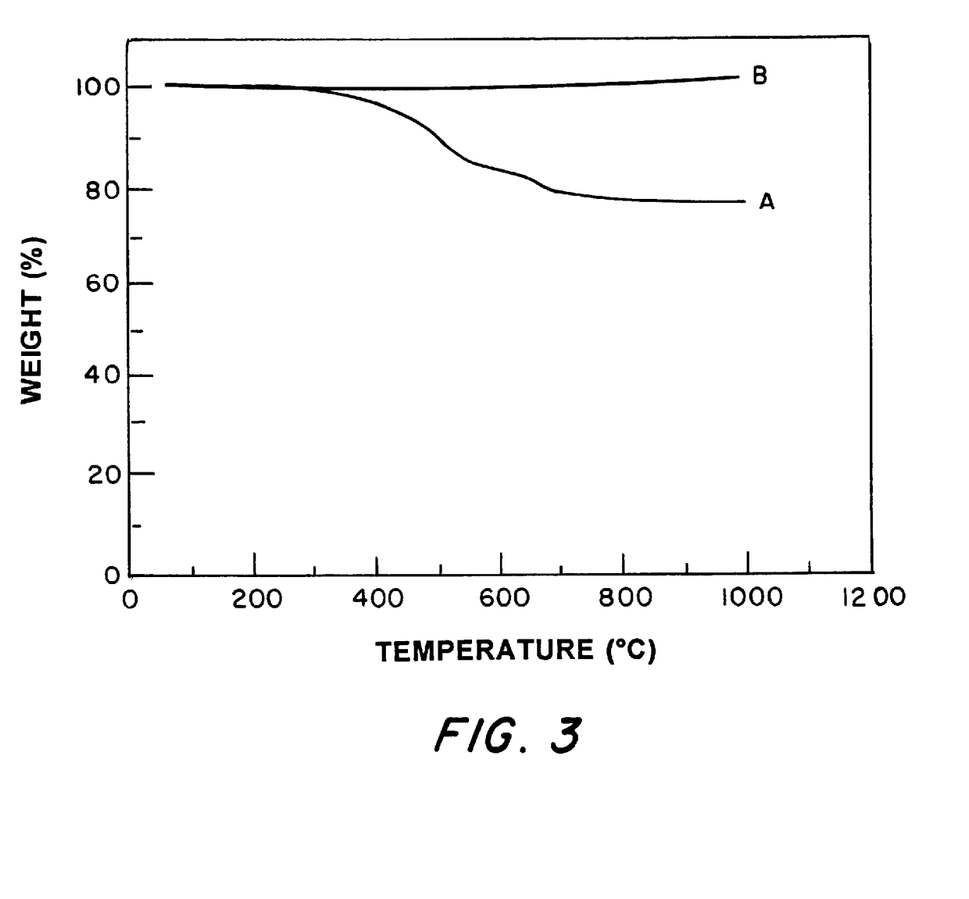
FIG. 3 is a thermogravimetric analysis (TGA) of tetramethydisiloxyl-carborane-ferrocenylene-diacetylene polymer under $N_2$ (A) and the resulting char in air (B)

Heat treatment of Polymer II to 350° C. under inert atmosphere results in the formation of a black, somewhat more elastomeric than usual thermoset with 98% weight retention. A small amount of shrinkage was observed during the formation of the thermoset. The elastomeric nature of this thermoset is most likely due to the incorporation of the longer carboranyl unit into the copolymer. This contrasts to the hard, tough thermosets obtained from siloxyl-diacetylene polymers such as poly(tetramethyl-disiloxyldiacetylene) reported by Son, D. Y.; Keller, T. N. *J Polym Sci: Part A: Polym. Chem.:* 1995, 33, 2969. Further heating of the thermoset to 1000° C. under N$_2$ affords a hard black, ferromagnetic ceramic in 78% ceramic yield. (FIG. 3). The ceramic chars obtained from pyrolysis of Polymers I and II to 1000° C. under $N_2$ were found to contain 16.6 and 4.89% iron, respectively, by elemental analysis. The elemental analysis of the chars from the pyrolysis of Polymers I and II to 1000° C. under $N_2$ respectively being: C, 56.8; H, 0.40; Si, 18.2; Fe, 16.6 and C, 35.7; H, 0.00; B, 20.25; Si, 21.7; Fe, 4.89. The elemental analysis of char obtained from heat treatment of Polymer II to 1500° C. gave: C, 35.67; H, 0.0; Si, 20.20; B, 20.44; Fe, 4.87.

Pyrolysis of the ceramic char obtained from Polymer I to 1000° C. (10° C./min) in air resulted in a weight retention of 55% at 750° C. As the temperature was increased, the sample slowly gained weight to yield a final weight retention of 60% at 1000° C. (FIG. 2). The observed weight gain is tentatively attributed to oxidation of the iron.

The ceramic chars obtained from Polymer II showed excellent oxidative stability with essentially 100% weight retention to 1000° C. in air (FIG. 3). The sample appears to maintain its magnetic character after such treatment. The excellent oxidative stability of Polymer II compared to that of Polymer I is attributed to the presence of the carborane groups in the copolymer backbone. High oxidative stabilities have been observed with related carborane containing polymers. See: Henderson, L. J.; Keller, T. M. *Macromolecules* 1994, 27, 1660 which is incorporated herein by reference.

Previous thermal (TGA) studies on 1,1'-ferrocenylenesiloxyl copolymer have shown these materials to have weight retentions of only 40–50% at 700° C. (10° C./min, $N_2$). (See: Patterson, W. J.; McManus, S. P.; Pittman, Jr. C. U., *J. Polym. Sci., Polym. Chem. Ed.* 1974, 12, 837, incorporated herein by reference.) The relatively high weight retention observed for Polymer II is attributed to prepyrolysis cross-linking of the diacetylene units. TGA of Polymer II to 1500° C. (10° C./min, $N_2$) revealed a second decomposition process beginning at 1350° C. and a final weight retention of 74%. Elemental analysis showed the latter material to be essentially identical in composition to samples that were prepared at 1000° C.

Differential scanning calorimetry (DSC) studies of Polymer I and II showed broad, strong exotherms with peak maxima from about 300° C. to 380° C. These exotherms are attributed to the thermal reaction (cross-linking) of the diacetylene groups. This latter assignment is supported by experiments on samples of Polymers I and II heated to 450° C., which showed the disappearance of the exotherm in the DSC trace and loss of the diacetylene absorption (2069 $cm^{-1}$) in the infrared spectrum.

Example 1
Synthesis of Polymer I

In a typical experiment, a solution of THF (10 ml) and n-BuLi (10.2 ml of 2.5 M, 25.5 mmol) at −78° C. was treated dropwise with hexachlorobutadiene (10 ml, 6.38 mmol) over 10 minutes. The reaction mixture was stirred at ambient temperature for 3 hours to afford dilithiobutadiyne. The resulting dark grey slurry was transferred via cannula to a flask containing dimethyldichlorosilane, $Me_2SiCl_2$ (1.55 ml, 12.78 mmol) in THF (5ml) at 0° C. The solution was stirred for thirty minutes at room temperature then cooled in an ice bath and treated with a slurry of dilithioferrocene●tmeda, (2.0 g, 6.37 mmol) in 10 ml of THF. The resulting dark brown solution was stirred for one hour at room temperature and an infrared spectrum (NaCl) taken.

The IR spectrum of the crude reaction mixture showed a small peak at 2140 $cm^{-1}$ (terminal diacetylene groups). Several drops of $Me_2SiCl_2$ were added via syringe and the solution stirred for 20 minutes. The infrared spectrum was remeasured and additional drops of $Me_2SiCl_2$ were added if required. After the terminal butadiyne groups were no longer observed in the infrared spectrum, the solution was quenched with ice cold saturated $NH_4Cl_{(aq)}$ and purified by aqueous workup and extraction with diethyl ether. The $Et_2O$ extracts were dried over $MgSO_4$, filtered, and the solvent removed leaving a viscous brown oil. Drying in vacuo at 50° C. for 8 hours gave a brown solid which was soluble in THF, ether, and acetone but poorly soluble in hexane. Yield: 1.89 g (86%).

Example 2
Synthesis of Polymer II

A solution of THF (10 mL) and n-BuLi (10.2 mL of 2.5M) in a 250 mL Schlenk flask was cooled to −78° C. The solution was treated with hexachlorobutadiene (1.0 mL, 6.38 mmol) dropwise over a period of 10 minutes. The cold bath was removed and the solution was stirred at room temperature giving a grey-brown slurry. After stirring for 2 hours at room temperature, the slurry of dilithiobutadiyne was transferred via cannula to a flask containing a THF solution (10 mL) of 1,7-bis(chlorotetramethyldisiloxyl)-m-carborane (6.10 g, 12.77 mmol) at 0° C. The resulting mixture was stirred at room temperature for 30 minutes giving a brown solution. The solution was cooled to 0° C. and treated with a slurry of $Li_2Cp_2Fe$●tmeda (2.0 g, 6.38 mmol) in 20 mL of THF which was added via cannula. The reaction mixture was stirred at room temperature for one hour.

Measurement of an FTIR spectrum of the crude reaction mixture showed the presence of small and variable amounts of terminal butadiyne groups (2140 $cm^{-1}$). These groups were found to be undesirable as they slowly cross-link at room temperature giving an insoluble material. Thus, when these groups were observed, they could be coupled by addition of 2–3 drops of 1,7-bis(chlorotetramethyldisiloxyl)-m-carborane. The reaction was quenched by addition of cold aqueous $NH_4Cl$. After aqueous work-up and extraction with diethyl ether, the orange-brown organic polymer solution was dried over $MgSO_4$, filtered, and the solvent removed by water aspiration to give a viscous brown oil. The oil was further dried by heating for several hours in vacuo at 70° C. giving a tacky, brown solid. Yield: 5.52 g (83%).

Example 3
Synthesis of Copolymer, Polymer III

Polymer III

A solution of THF (10 mL) and n-BuLi (10.2 mL of 2.5M) in a 250 mL Schlenk flask was cooled to −78° C. The solution was treated with hexachlorobutadiene (1.0 mL, 6.38 mmol) dropwise over a period of 10 minutes. The cold bath was removed and the solution was stirred at room temperature giving a grey-brown slurry. After stirring for 2 hours at room temperature, the slurry of dilithiobutadiyne was transferred via cannula to a flask containing a THF solution (10 mL) of dimchloromethylsilane (1.21 g, 12.77 mmol) at 0° C. The resulting mixture was stirred at room temperature for 30 minutes giving a brown solution. The solution was cooled to 0° C. and treated with a slurry of $Li_2Cp_2Fe$●tmeda (2.0 g, 6.38 mmol) in 20 mL of THF which was added via cannula. The reaction mixture was stirred at room temperature for one hour.

Measurement of an FTIR spectrum of the crude reaction mixture showed the presence of small and variable amounts of terminal butadiyne groups (2140 cm$^{-1}$). These groups were found to be undesirable as they slowly cross-link at room temperature giving an insoluble material. Thus, when these groups were observed, they could be coupled by addition of 2–3 drops of dimethylchlorosilane. The reaction was quenched by addition of cold aqueous $NH_4Cl$. After aqueous work-up and extraction with diethyl ether, the orange-brown organic polymer solution was dried over $MgSO_4$, filtered, and the solvent removed by water aspiration to give a viscous brown oil. The oil was further dried by heating for several hours in vacuo at 70° C. giving a tacky, brown solid, which was the copolymer, Polymer III. Yield: 1.67 g (82%)

Example 4
Synthesis of Polymer IV

Polymer IV

A solution of THF (10 mL) and n-BuLi (10.2 mL of 2.5M) in a 250 mL Schlenk flask was cooled to −78° C. The solution was treated with hexachlorobutadiene (1.0 mL, 6.38 mmol) dropwise over a period of 10 minutes. The cold bath was removed and the solution was stirred at room temperature giving a grey-brown slurry. After stirring for 2 hours at room temperature, the slurry of dilithiobutadiyne was transferred via cannula to a flask containing a THF solution (10 mL) of 1,3-dichlorotetramethyldisiloxane (2.60 g, 12.77 mmol) at 0° C. The resulting mixture was stirred at room temperature for 30 minutes giving a brown solution. The solution was cooled to 0° C. and treated with a slurry of $Li_2Cp_2Fe$●tmeda (2.0 g, 6.38 mmol) in 20 mL of THF which was added via cannula. The reaction mixture was stirred at room temperature for one hour.

Measurement of an FTIR spectrum of the crude reaction mixture showed the presence of small and variable amounts of terminal butadiyne groups (2140cm$^{-1}$). These groups were found to be undesirable as they slowly cross-link at room temperature giving an insoluble material. Thus, when these groups were observed, they could be coupled by addition of 2–3 drops of 1,3-dichlorotetramethyldisiloxane. The reaction was quenched by addition of cold aqueous $NH_4Cl$. After aqueous work-up and extraction with diethyl ether, the orange-brown organic polymer solution was dried over $MgSO_4$, filtered, and the solvent removed by water aspiration to give a viscous brown oil. The oil was further dried by heating for several hours in vacuo at 70° C. giving a viscous, brown solid which was the copolymer, Polymer IV. Yield 2.65 g (84%).

Example 5

Synthesis of Polymer V:

Polymer V

A solution of THF (10 ml) and n-BuLi (5.1 ml of 2.5 M, 12.75 mmol) at −78° C. was treated dropwise with hexachlorobutadiene (0.5 ml, 3.20 mmol) over 10 minutes. The reaction mixture was stirred at ambient temperature for 3 hours. The resulting dark grey slurry was transferred via cannula to a flask containing $Me_2SiCl_2$ (1.55 ml, 12.78 mmol) in THF (5 ml) at 0° C. The solution was stirred for thirty minutes at room temperature then cooled in an ice bath and treated with a slurry of $(LiC_5H_4)_2Fe$ tmeda (3.0 g, 9.55 mmol) in 20 ml of THF. The resulting dark brown solution was stirred for one hour at room temperature and an infrared spectrum (NaCl) taken.

The IR spectrum of the crude reaction mixture showed a small peak at 2140 cm$^{-1}$ (terminal diacetylene groups). Several drops of $Me_2SiCl_2$ were added via syringe and the solution stirred for 20 minutes. The infrared spectrum was remeasured and additional drops of $Me_2SiCl_2$ were added if required. After the terminal butadiyne groups were no longer observed in the infrared spectrum, the solution was quenched with ice cold saturated $NH_4Cl_{(aq)}$ and purified by aqueous workup and extraction with diethyl ether. The $Et_2O$ extracts were dried over $MgSO_4$, filtered, and the solvent removed leaving a viscous brown oil. Drying in vacuo at 50° C. for 8 hours gave a brown solid (the copolymer, Polymer V) which was soluble in THF, ether, and acetone but poorly soluble in hexane. Yield: 2.21 g (83%).

Example 6
Synthesis of the Thermoset of Polymer I

A 2.41 g sample of Polymer I was placed in an aluminum planchet. The sample was heated to 90° C. The sample was slowly placed under vacuum so as not to foam from the planchet. Evolution of volatiles had ceased after 20 minutes and the sample was held under full vacuum for 2 hours at 90° C. The sample was then cooled to room temperature and placed in a furnace under an argon atmosphere. The sample was then heated to 350° C. then cooled to 50° C. using the following heating sequence: Heated to 200° C. over 30 min.; isothermed at 200° C. for 120 min.; heated to 250° C. over 60 min.; isothermed at 250° C. for 180 min.; heated to 300° C. over 60 min.; isothermed at 300° C. for 180 min.; heated to 350° C. over 60 min; isothermed at 350° C. for 180 min.; cooled to 50° C. over 480 min. Upon removal from the planchet, the thermoset (2.33 g) was hard and visually void free.

Example 7
Synthesis of the Thermoset of Polymer II

A 2.23 g sample of Polymer II was placed in an aluminum planchet and heated to 80° C. The sample was slowly placed under vacuum so as not to foam from the planchet. Evolution of volatiles had ceased after 15 minutes and the sample was held under full vacuum, for one hour at 80° C. then heated an additional hour at 100° C. under full vacuum. The sample was then cooled to room temperature and placed in a furnace under an argon atmosphere. The sample was then heated to 350° C. then cooled to 50° C. using the following heating sequence: Heated to 200° C. over 30 min.; isothermed at 200° C. for 120 min.; heated to 250° C. over 60 min.; isothermed at 250° C. for 180 min.; heated to 300° C. over 60 min.; isothermed at 300° C. for 180 min.; heated to 350° C. over 60 min; isothermed at 350° C. for 180 min.; cooled to 50° C. over 480 min. The thermoset (2.14 g) was removed from the planchet and was elastomeric and visually void free.

Example 8
Synthesis of the Ceramic Obtained From Thermoset of Polymer I (Example 6)

A 1.93 g sample of the thermoset obtained from heat treatment of Polymer I to 350° C. (Example 6) was heated slowly to 1000° C. in a furnace using the following heating cycle: Heated to 300° C. from room temperature over 2 hours; isothermed at 300° C. for 2 hours; heated to 400° C. over 2 hours; isothermed at 400° C. for 3 hours; heated to 450° C. for one hour, isothermed at 450° C. for 3 hours; heated to 500 over one hour; isothermed at 500° C. for 3 hours; heated to 550° C. over one hour; isothermed at 550° C. for 3 hours; heated to 600° C. over one hour; isothermed at 600° C. for 3 hours; heated to 700° C. over 2 hours; isothermed at 700° C. for 2 hours; heated to 1000° C. over 3 hours. The sample was slowly cooled to 50° C. over 10 hours. The resulting ceramic (1.46 g) was hard and ferromagnetic as observed from its attraction to a bar magnet.

Example 9
Synthesis of Ceramic Obtained Directly from Polymer I (Example 1)

In the TGA, a 19.9 mg sample of Polymer I was placed in a ceramic crucible and heated from room temperature to 1000° C. under a nitrogen atmosphere at a rate of 10° C./min. After cooling to room temperature, a lustrous black ceramic remained (15.3 mg). The ceramic product was hard and ferromagnetic (attracted to a bar magnet).

Example 10
Synthesis of Ceramic Obtained Directly from Polymer 1 (Example 1))

In the TGA, an 18.9 mg sample of Polymer I was placed in a ceramic crucible and heated from room temperature to 1500° C. under a nitrogen atmosphere at a rate of 10° C./min. After cooling to room temperature, a lustrous black ceramic remained (14.2 mg). The ceramic product was hard and ferromagnetic (attracted to a bar magnet).

Example 11
Synthesis of Ceramic Obtained from Thermoset of Polymer II (Example 7)

A 1.89 g sample of the thermoset obtained from heat treatment of Polymer II to 350° C. (Example 7) was heated slowly to 1000° C. in a furnace using the following heating cycle: Heated to 300° C. from room temperature over 2 hours; isothermed at 300° C. for 2 hours; heated to 400° C. over 2 hours; isothermed at 400° C. for 3 hours; heated to 450 for one hour; isothermed at 450° C. for 3 hours; heated to 500° C. over one hour, isothermed at 500° C. for 3 hours; heated to 550° C. over one hour; isothermed at 550° C. for 3 hours; heated to 600° C. over one hour, isothermed at 600° C. for 3 hours; heated to 700° C. over 2 hours; isothermed at 700° C. for 2 hours;

heated to 1000° C. over 3 hours. The sample was slowly cooled to 50° C. over 10 hours. The resulting ceramic (1.42 g) was hard and ferromagnetic as observed from its attraction to a bar magnet.

Example 12
Synthesis of Ceramic Obtained Directly from Polymer II (Example 2)

In the TGA, a 23.2 mg sample of Polymer II was placed in a ceramic crucible and heated from room temperature to 1500° C. under a nitrogen atmosphere at a rate of 10° C./min. After cooling to room temperature, a lustrous black ceramic remained (17.8 mg). The ceramic product was hard and ferromagnetic (attracted to a bar magnet).

Example 13

The ceramics made by pyrolysis of Polymer I and Polymer II were subjected to elemental analysis. The results are provided in Tables 1 and 2.

TABLE 1

Elemental Analysis of Polymer I and Ceramic Therefrom

|  | % C | % H | % Si | % Fe |
|---|---|---|---|---|
| Polymer | 62.06 | 5.79 | 16.12 | 16.03 |
| Ceramic (pyrolized at 1000° C.) | 59.68 | 0.0 | 16.93 | 17.16 |

TABLE 2

Elemental Analysis of Polymer II and Ceramic Therefrom

|  | % C | % H | % Si | % B | % Fe |
|---|---|---|---|---|---|
| Polymer | 39.05 | 7.33 | 21.49 | 20.68 | 5.34 |
| Ceramic (pyrolized at 1000° C.) | 35.66 | 0.0 | 21.67 | 20.25 | 4.89 |

Obviously, many modifications and variations of the present invention are possible in light of the above teachings. It is therefore to be understood that, within the scope of the appended claims, the invention may be practiced otherwise than as specifically described. It should also be noted that the entire specification and claims of the co-filed applications of the same title, now U.S. Pat. Nos. 5,986,032 and 5,844,052, are herein incorporated by reference for all purposes.

What is claimed is:

1. A process for making a transition metal-containing ceramic comprising the step of pyrolyzing an organometallic linear polymer containing at least one metallocenylene unit, at least one silyl or siloxyl unit, and at least one acetylene unit to form a ceramic.

2. The process of claim 1 wherein the pyrolyzing step comprises heating the linear polymer from room temperature to a temperature of at least 1000° C.

3. The process of claim 1 wherein the pyrolyzing step is carried out in an inert atmosphere.

4. A process for making a transition metal-containing ceramic comprising the steps of:
   (1) forming an organometallic linear polymer containing at least one metallocenylene, at least one silyl or siloxyl unit, and at least one acetylene unit;
   (2) crosslinking said linear polymer through the acetylene units, thereby forming a thermoset; and
   (3) pyrolyzing said thermoset to form a ceramic.

5. The process of claim 4 wherein the pyrolyzing step is carried out in an inert atmosphere.

6. The process of claim 4 wherein the crosslinking step comprises a photochemical or thermal processes.

7. The process of claim 4 wherein the crosslinking step comprises heat treatment of the organometallic linear polymer from room temperature to about 350° to 500° C.

8. The process of claim 4 wherein the pyrolyzing step comprises heat treatment in excess of about 500° C.

9. The process of claim 1 wherein the pyrolyzing step comprises heat treatment in excess of about 500° C.

10. The process of claim 4 further comprising the step of incorporating fibers or particles into the linear organometallic polymer prior to the crosslinking step.

11. The process of claim 1 further comprising the step of incorporating fibers into the linear organometallic polymer prior to the pyrolyzing step.

12. The process of claim 4 wherein the thermoset comprises:

wherein:

$(C=C)_x$ represents a structure consisting of a plurality of crosslinked acetylenic moieties;

x is greater than or equal to one;
z is greater than or equal to one;
w is greater than or equal to one;
y is greater than or equal to one;
a is greater than or equal to one;
$R^1, R^2, R^3, R^4, R^5, R^6, R^7$, and $R^8$ are the same or different and are selected from the group consisting of H, unsubstituted hydrocarbon moieties, substituted hydrocarbon moieties, and halogen;
M=Fe, Ru, Os, or a combination thereof;

$$E = \left[\left[\begin{bmatrix} R^9 \\ | \\ Si-O \\ | \\ R^{10} \end{bmatrix}_f \begin{bmatrix} R^{11} \\ | \\ Si \\ | \\ R^{12} \end{bmatrix}_g\right]_h [CB_kH_kC]_q \left[\begin{bmatrix} R^{11} \\ | \\ Si \\ | \\ R^{12} \end{bmatrix}_s \begin{bmatrix} R^9 \\ | \\ O-Si \\ | \\ R^{10} \end{bmatrix}_t\right]_p\right] \text{ or } R^{13}B;$$

f is greater than or equal to zero;
g is greater than or equal to one;
h is greater than or equal to one;
p is greater than or equal to zero;
q is greater than or equal to zero;
s is greater than or equal to zero and is greater than or equal to one when q is greater than or equal to one;
t is greater than or equal to zero;
k=3 to 16;
$R^9$, $R^{10}$, $R^{11}$, $R^{12}$ may be the same or different and wherein each is selected from the group consisting of H, unsubstituted hydrocarbon moieties, and substituted hydrocarbon moieties; and
$R^{13}$=unsubstituted or substituted hydrocarbon moieties.

13. The process of claim 12 wherein the thermoset is

14. The process of claim 12 wherein the organometallic linear polymer is

15. The process of claim 12 wherein the thermoset is

16. The process of claim 12 wherein the thermoset is

17. The process of claim 12 wherein the thermoset is

* * * * *